July 3, 1945.   C. W. LANHAM   2,379,724
SEED PLANTER
Filed Jan. 5, 1944   2 Sheets-Sheet 1
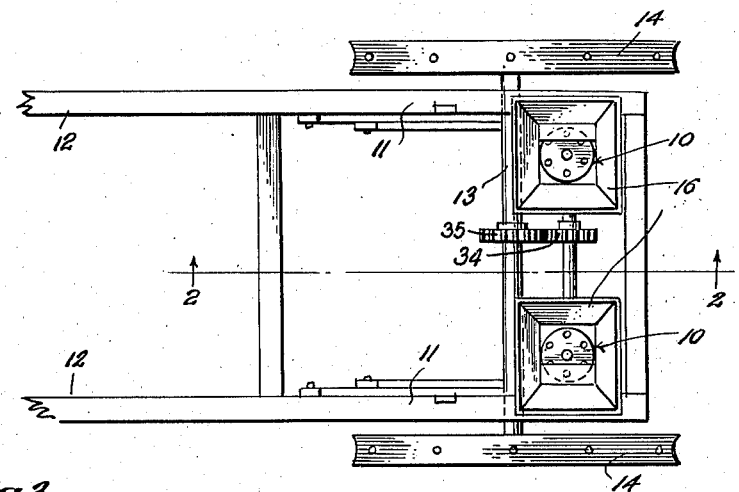
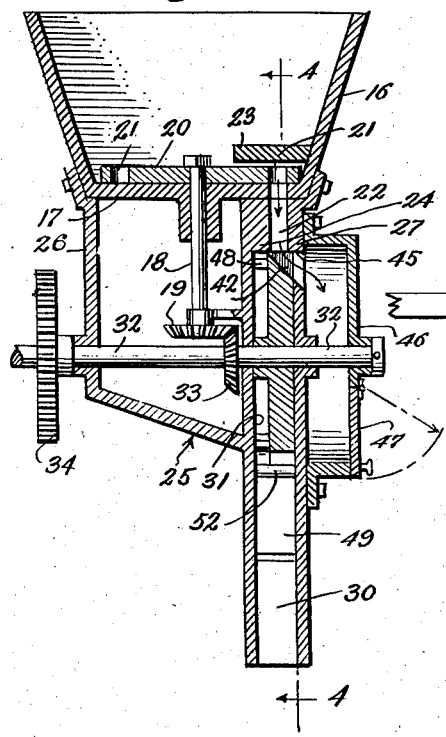
Inventor
COLONEL WOLFORD LANHAM
By Wilfred E. Lawson
Attorney

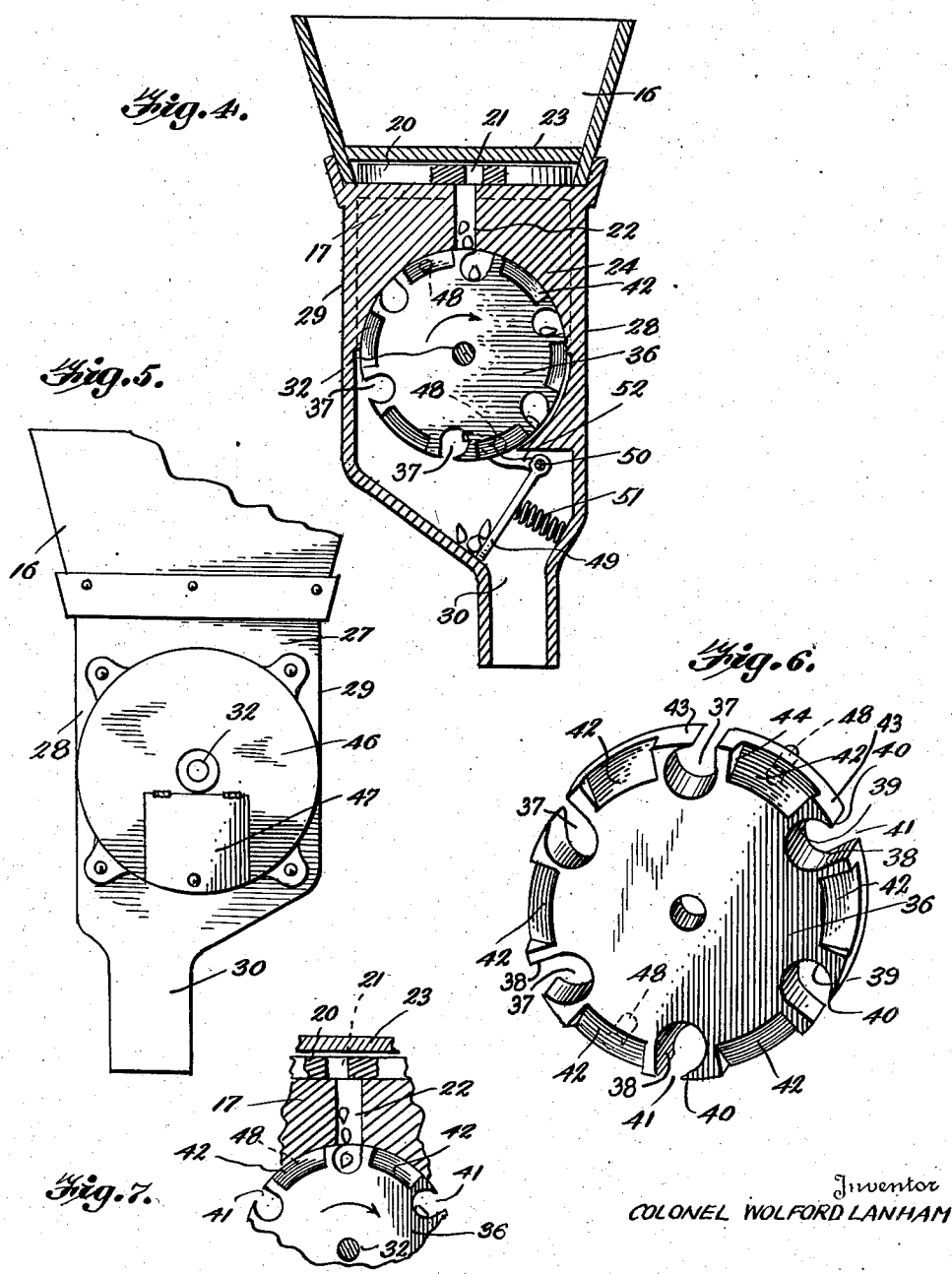

Patented July 3, 1945

2,379,724

UNITED STATES PATENT OFFICE 2,379,724

SEED PLANTER

Colonel W. Lanham, Chicago, Ill., assignor to Lillian W. Lanham, Chicago, Ill.

Application January 5, 1944, Serial No. 517,087

8 Claims. (Cl. 111—51)

This invention relates generally to class of agricultural machinery and more particularly to seed planters, especially planters for corn.

In the planting of corn a standard hill comprises three kernels or seeds. Unless the planting is done by hand it is not possible to get three seeds or kernels in each hill since machines are not designed or constructed to limit the discharge of the seed to this or any other number. Accordingly the general practice is to plant by machinery, by which anywhere from three to six or seven kernels are dropped in a hill, and then go over the field at a later date when the plants have come up, and chop out or pull up all but three plants. This practice is wasteful of material and of the farmer's time since it means that the farmer or a helper must take time which could be well spent in some other pursuit to go over the field and remove the excess plants.

The principal object of the present invention is to provide a corn planting machine which is designed to eliminate the present wasteful planting of unnecessary kernels or grains of corn and consequently the subsequent necessity of again going over the field and removing from each of the hills the extra or unwanted plants.

Another object of the invention is to provide in a corn planting machine a novel arrangement hopper seed disk and pocketed wheel cooperating therewith, by means of which only a single grain of corn will be received in each pocket and extra or additional grains discharged by the hopper disk will be shunted or carried off into a side receiver, means being provided whereby after three of the wheel disk pockets have discharged one kernel each, the three kernels will be released to be deposited in the hill.

A further object of the invention is to provide in a seed planter of the character stated, a novel means forming a part of the pocketed seed wheel, of separating one seed or kernel from a group which may be fed to it from the hopper disk, without damaging the separated seed or those from which it has been separated.

The invention will be best understood from a consideration of the following detailed description taken in connection with the accompanying drawings, with the understanding that the invention is not to be confined to any strict conformity with the showing of the drawings but may be changed or modified so long as such changes or modifications mark no material departure from the essential features of the invention as expressed in the appended claims.

In the drawings:

Figure 1 is a view in top plan of a two row planter constructed in accordance with the present invention.

Figure 2 is a vertical longitudinal section taken substantially on the line 2—2 of Figure 1.

Figure 3 is a vertical section through the planter in the plane of and paralleling the disk operating axle or shaft.

Figure 4 is a vertical section taken substantially on the line 4—4 of Figure 3.

Figure 5 is a view in side elevation of the outer side of the planter unit.

Figure 6 is a view in perspective of the pocketed selector wheel.

Figure 7 is a detailed section corresponding to Figure 4 but showing the seed disks and selector wheel in their relative positions at the moment of separating a single seed from the group dropped into the seed passage.

Referring now more particularly to the drawings there is illustrated in Figure 1, in top plan, a two row planter showing a pair of seed drills constructed in accordance with the present invention, wherein each of such drills or seed feeding units is generally designated 10. These units or drills 10 are suitably supported upon a supporting frame 11 which includes the shares 12 which provide a means for attaching draft animals to the planter or, any other suitable means may be employed for facilitating movement of the machine over the ground, such as a tractor or the like.

The frame 11 is supported upon the transverse axle 13 and the ground engaging wheels 14 and supported in the customary manner at each side of the frame is a furrow opening plow or shoe 15 in association with the rear part of which the kernel dropping boot operates in the customary manner.

Each of the seed feeding planter units comprises a hopper 16 having a bottom or floor 17 through the center of which extends, for rotation on a vertical axis, the feed disk operating shaft 18, upon the lower end of which is carried the bevel or miter gear 19.

Within the hopper there rests upon the floor 17 the rotary seed disk 20 which is secured to the upper end of the shaft 18 and which is provided with the annular series of seed openings 21 in each of which a number of seeds is trapped from the hopper to be carried around to the downwardly extending discharge passage 22.

Within the hopper there is located over the disk 20 and above the end of the passage 22, the guide plate 23 which prevents a flow of seed from the hopper directly downwardly into the passage 22 when an opening 21 alines with the upper end of the passage.

The passage 22 is formed vertically in the outer side of a vertical wall 24 which may form a fixed part of the hopper floor 17 as shown.

Beneath the hopper is a gear and wheel box which is generally designated 25 and which comprises the inner and outer side walls 26 and 27 respectively, the front and rear walls 28 and 29 and the seed discharge boot 30 which is formed as an integral part of the walls of the box 25 and is set at the outer side of the box directly below and in alinement with the seed passage 22.

As previously stated the passage 22 is cut in the outer face of the wall 24 and below the passage 22 the outer face of this wall is provided with a recess 31, the upper part of which is semi-circular as shown in Figure 4.

Extending through the box 25, through the outer and inner walls, is a shaft 32 which has secured thereto, inwardly of the wall 24, the miter gear 33 which meshes with the gear 19. In a two row planter such as is here illustrated, this shaft 32 may extend through from one unit to the other so that the single shaft serves both units.

Mounted upon the shaft 32 is a gear 34 which is connected with a corresponding gear 35 which is mounted upon the machine axle, whereby rotary power may be transferred from the machine wheels through to the shaft 32, the hopper feed disk 20 and the seed selector wheel 36 which is mounted upon the shaft 32 and is positioned within the recess 31 as illustrated. Accordingly it will be understood that the shaft 32 passes through the recess 31 at the radial center thereof.

As shown the periphery of the seed selector wheel 36 covers the lower end of the seed passage 22 and the outer side of the passage 22 and the recess 31 are covered by the outer wall 27 of the gear and wheel box.

The seed selector wheel 36 has a number of seed receiving pockets 37 formed in the periphery thereof. The forward side of each pocket which is the advancing side, is defined by a straight outwardly extending or substantially radial wall 38 while the trailing side is defined by a substantially semi-circular wall 39 which latter wall runs into or merges with the periphery of the wheel thereby forming the relatively sharp edge 40 which forms the rear side of the entrance 41 of the seed pocket.

Between the seed pockets 37 a portion of the outer corner of the wheel 36 is beveled off to provide the outwardly and downwardly sloping inclined face 42. This beveled portion is spaced at its ends from the two pockets between which it is located so that upon each side of each pocket the peripheral face of the wheel remains flat or straight across forming behind each edge 40 of each pocket the transversely straight surface or table upon which excess seeds passing through the passage 22 are trapped, such table being designated 43 and the manner in which it catches the seeds being shown in Figure 4. Also at each end of the beveled or inclined faces between the pockets a shoulder 44 is formed, the rear or trailing one of each pair of which functions to prevent seeds which may be trapped on the inclined surface 42 from getting into the following pocket.

The outer wall 27 of the gear box is cut away transversely to form a lateral discharge port 45, the lower edge of which is outwardly and downwardly beveled and comes up to the lower part of the beveled face 42 when it is disposed across the lower end of the passage 22 so that any seeds resting upon such beveled face or dropped thereon from the passage will be discharged outwardly through the port 45. It will be noted that the seed pockets 37 are of a depth to extend inwardly a greater distance than the inclined faces 42 so that a seed in a pocket cannot escape therefrom because it will be below the bottom edge of the port 45.

The numeral 46 designates a seed box which is mounted upon the outside wall 27 and into which the port 45 discharges. This box may have a door 47 or any other suitable means by which it can be opened for the removal of rejected seeds.

The seed pockets 37 are divided in groups of three by the trip pins 48 which are secured upon the inner face of the wheel 36 as illustrated in Figure 3.

Pivotally supported at the upper end of the boot 30 beneath the seed selector wheel, is the valve gate 49, the pivotal support for which is indicated at 50. This valve gate is normally urged upwardly into closed position by a spring 51 and integrally coupled with the gate is a lever arm 52 which extends upwardly across the inner face of the selector wheel 36 in position to be engaged and forced downwardly by the pins 48 during rotation of the selector wheel whereby to effect the downward swinging to open position of the valve gate 49.

In the operation of the corn planter the gears 19 and 33 are set so that when a pocket of the seed selector wheel has its entrance opening directly registering with the lower end of the seed passage 22 an opening 21 of the feed disk 20 will be approximately half way across the upper end of the seed passage 22 as illustrated in Figure 7. With this arrangement before all of the seeds contained in the opening 21 are dropped into the passage 22 the entrance opening of the pocket will be about half way across the lower end of the passage and since the passage 22 is of such size that the seeds must travel one behind the other, the sharp edge 40 of the pocket will slip between the first seed which has had a chance to enter the pocket, and the second seed so that only one seed will be selected while the others will be caught upon the table 43 and held in the passage until the following inclined surface 42 comes into position beneath the lower end of the passage 22. The retained seeds will then drop down on to the shoulder or sloping surface 42 and be discharged laterally into the reject box 46. By the provision of the shoulder 44 at the trailing end of the inclined surface 42 the possibility of the seeds which are caught upon the surface 42 entering the next pocket 37 will be avoided.

This selection by the wheel 36 of one seed for each pocket continues until three of the pockets have moved around and discharged one seed each below the wheel 36 on to the valve plate 49 whereupon the pin following the third pocket engages the arm 52 and opens the valve to drop the three seeds, forming a standard hill, down into the furrow which has been formed by the plow shoe 15.

It will be readily apparent from the foregoing that the present machine is highly desirable from an economic viewpoint due to the fact that it will not plant more seeds in a hill than is required and those seeds which are rejected by the selector wheel 36 can be removed from the box 46 and returned to the hopper until all have been planted.

The usual later operation of going through the field and removing, by chopping out or pulling up, all plants in excess of three in each hill is likewise avoided, as a result of which much time is saved and also there is avoided the possibility of damaging the plants which are allowed to remain in the hill. Such damage frequently occurs as a result of careless cutting out of the undesired plants.

I claim:

1. A corn planter comprising a hopper, means providing a seed passage leading downwardly from the hopper, means for discharging seeds from the hopper into the passage, a boot below the passage for the reception and conveyance of seeds to the ground, a valve means closing the upper end of the boot, means between the passage and the valve means for selecting single seeds from the passage and conducting such seeds singly to and discharging the same onto the valve means, means for opening the valve means when a predetermined number of seeds have been deposited thereon, and means for discarding seeds remaining in the passage after one thereof has been removed.

2. A seed planter comprising a hopper, means providing a downwardly extending passage leading from the hopper, means in the hopper for conveying seeds to said passage, means below the passage for conducting seeds to the ground, a valve closing the upper end of the last mentioned means, a peripherially pocketed wheel supported in the vertical plane of the passage for rotation on an axis perpendicular to the passage, the periphery of the wheel closing the passage at its lower end, the pockets in said periphery being arranged to successively cross the lower end of the passage, each of said pockets having a sharpened trailing edge at the entrance thereof designed to pass between seeds moving downwardly through the passage to select one only from a group, and means for effecting the opening of the valve after a predetermined number of seeds has been discharged downwardly from the wheel pockets and deposited upon the valve plate.

3. A seed planter as set forth in claim 2, in which said pocketed wheel has an edge between the pockets beveled off to receive seeds left in the passage, and means facilitating the discharge of seeds from a beveled portion of the wheel into a receiving means at the side of the wheel.

4. A corn planter comprising a hopper having a bottom floor, means forming a seed conducting passage leading downwardly from the floor, rotary means upon the top of the floor having a circular series of apertures for conducting seeds to said passage, a shaft extending transversely of the passage below and spaced from the lower end thereof, means for driving said shaft, means coupling the shaft with said disk for effecting turning of the disk, a seed conducting boot disposed in alinement with the passage and below the shaft, a pivoted valve plate closing the upper end of the boot, means normally urging the valve plate to closed position, a peripherally pocketed wheel supported upon the shaft in the vertical plane of the passage whereby upon rotation the pockets of the wheel will pass across the lower end of the passage to receive seeds therefrom, each of said pockets having an entrance opening defined by a sharp edge at the trailing side thereof, the pockets discharging downwardly upon the valve plate, means for opening the valve plate after a predetermined number of pockets have discharged seeds thereonto, and means for removing from the passage seeds left therein after movement of a pocket across the lower end of the passage.

5. A corn planter comprising a hopper having a bottom floor, means forming a seed conducting passage leading downwardly from the floor, rotary means upon the top of the floor having a circular series of apertures for conducting seeds to said passage, a shaft extending transversely of the passage below and spaced from the lower end thereof, means for driving said shaft, means coupling the shaft with said disk for effecting turning of the disk, a seed conducting boot disposed in alinement with the passage and below the shaft, a pivoted valve plate closing the upper end of the boot, means normally urging the valve plate to closed position, a peripherally pocketed wheel supported upon the shaft in the vertical plane of the passage whereby upon rotation the pockets of the wheel will pass across the lower end of the passage to receive seeds therefrom, each of said pockets having an entrance opening defined by a sharp edge at the trailing side thereof, the pockets discharging downwardly upon the valve plate, means for opening the valve plate after a predetermined number of pockets have discharged seeds thereonto, means for removing from the passage, seeds left therein after movement of a pocket across the lower end of the passage, and said disk and wheel being timed for rotation so that the entrance opening to a pocket will be in full communication with the lower end of said passage when a seed carrying aperture of the disk is approximately half-way into full registering relation with the upper end of the passage.

6. A corn planter comprising a hopper having a bottom floor, means forming a seed conducting passage leading downwardly from the floor, rotary means upon the top of the floor having a circular series of apertures for conducting seeds to said passage, a shaft extending transversely of the passage below and spaced from the lower end thereof, means for driving said shaft, means coupling the shaft with said disk for effecting turning of the disk, a seed conducting boot disposed in alinement with the passage and below the shaft, a pivoted valve plate closing the upper end of the boot, means normally urging the valve plate to closed position, a peripherally pocketed wheel supported upon the shaft in the vertical plane of the passage whereby upon rotation the pockets of the wheel will pass across the lower end of the passage to receive seeds therefrom, each of said pockets having an entrance opening defined by a sharp edge at the trailing side thereof, the pockets discharging downwardly upon the valve plate, means for opening the valve plate after a predetermined number of pockets have discharged seeds thereonto, means for removing from the passage, seeds left therein after movement of a pocket across the lower end of the passage, the said means for carrying off seed left in the passage by a pocket of the wheel, comprising a sloping face formed across the periphery of the wheel behind and spaced from each pocket, onto which seeds fall after the pocket has passed the lower end of the passage, a discharge port adjacent to said sloping face through which seed may pass from the sloping face, and a receptacle supported to receive seed from the discharge port.

7. A corn planter, comprising a hopper, a tubular seed passage leading downwardly from the hopper, means for dispensing a selected number of seeds into the upper end of the passage, the passage being of a size relative to the seeds to maintain seeds passing therethrough substantially one behind the other, means below the passage to receive and conduct seeds to the ground, a valve closing said seed receiving means, and a rotary disk between the valve and the lower end of the passage and having its peripheral surface lying across said lower end of the passage, the peripheral portion of the disk having pockets each having a tapered trailing edge designed to move across the passage to separate out a single seed from a number flowing down the passage and discharge the seed onto said valve, and means for intermittently opening the valve.

8. A corn planter as set forth in claim 7, in which the first mentioned means comprises a moving disk having seed carrying openings moving successively across the upper end of the passage, and said moving disk and said rotary disk moving in a timed relation whereby each pocket of the rotary disk moves across the passage slightly in advance of the movement of an opening of the moving disk across the opening.

COLONEL W. LANHAM.